March 13, 1956  L. A. KAHLAN ET AL  2,738,114
BUMPER GUARDS WITH CARRY HANDLE FOR THERMOS BOTTLES
Filed Feb. 8, 1954
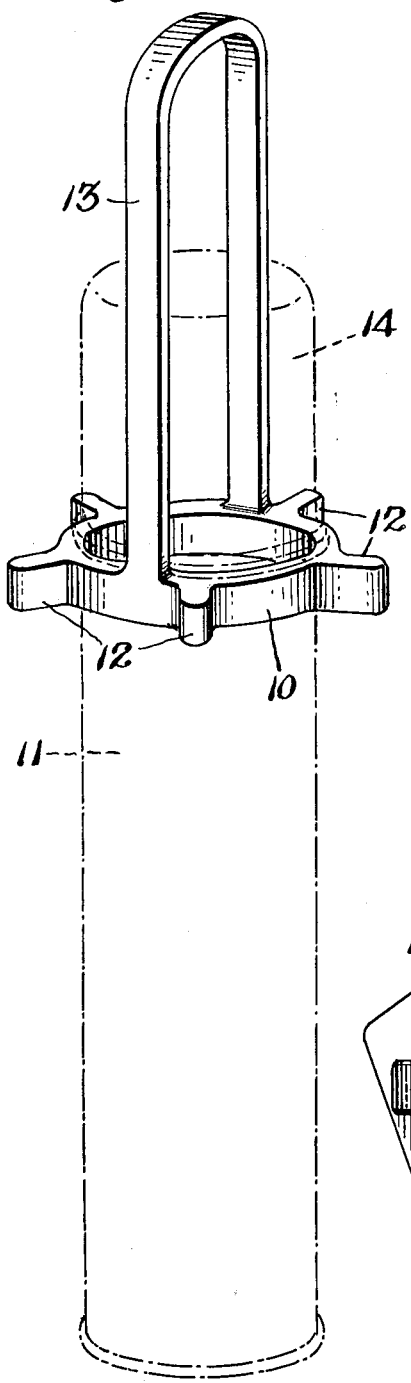
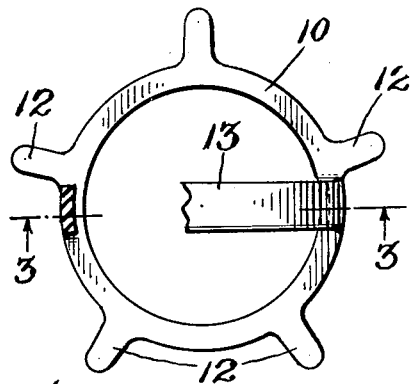
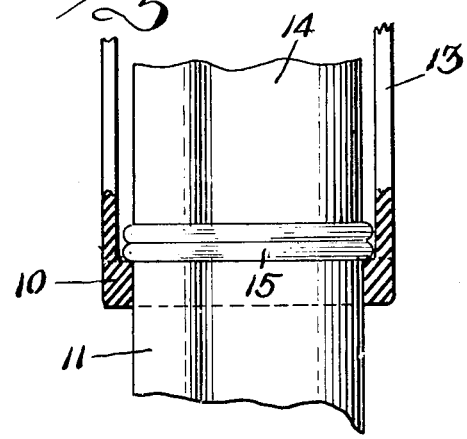
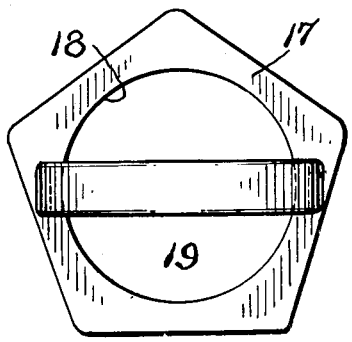
INVENTORS
Louis A. Kahlan
Lillian M. Kahlan,

United States Patent Office 2,738,114
Patented Mar. 13, 1956

2,738,114

BUMPER GUARDS WITH CARRY HANDLE FOR THERMOS BOTTLES

Louis A. Kahlan and Lillian M. Kahlan, Verona, Pa.

Application February 8, 1954, Serial No. 408,682

1 Claim. (Cl. 224—45)

This invention relates to a combined bumper guard and carry handle for thermos bottles.

It is an object of the present invention to provide a bumper guard for thermos bottles formed of an annular formation with bumper projections extending outwardly therefrom and an integral handle extending upwardly from the annular portion and adapted to serve as a carry handle for the thermos bottle.

It is another object of the present invention to provide a bumper guard for thermos bottles which will absorb the shock when the bottle is tipped over and which will prevent the thermos bottle from rolling under its own weight when it is tipped over and wherein there is provided a handle upon the guard which is sufficiently long to permit the carrier to slip his arm through the handle and thereby make the thermos bottle easier to handle and carry and allows his hands to be free to carry other items.

Other objects of the invention are to provide a combined bumper guard and carry handle for thermos bottles which is of simple construction, inexpensive to manufacture, easy to apply to the bottle, has a minimum number of parts, durable, formed of rubber or rubber-like plastic, of pleasing appearance, convenient and effective in use.

For a better understanding of the invention, reference may be had to the following detailed description taken in connection with the accompanying drawing, in which:

Figure 1 is a perspective view of the combined guard and carrier handle attached to the upper end of a thermos bottle;

Fig. 2 is a top plan view of the combined guard and handle with a portion of the handle broken away;

Fig. 3 is a fragmentary sectional view taken generally on line 3—3 of Fig. 2;

Fig. 4 is a top plan view of a modified form of guard and handle.

Referring now particularly to Figs. 1, 2 and 3, 10 represents an annular portion formed of rubber or rubber-like plastic and slightly undersize of the diameter of thermos bottle 11 so that a tight grip can be effected of the portion 10 with the surface of the bottle. The annular portion 10 has a plurality of radially outwardly extending projections 12 on the outer periphery thereof adapted to interrupt any blow of the top of the thermos bottle with the surface upon the bottle being tipped over. An integral handle of U-shape as indicated at 13 is connected to the top of the annular portion 10 and is sufficiently long and extends a sufficient distance above cover 14 of the bottle as to permit the arm to be slid through handle. The top of the annular portion at the inner periphery thereof can engage with a shoulder or flange 15 at the top of the bottle. It will be noted that the projections 12 are sufficiently spaced as to hold the bottle against rolling under its own power and from a table surface on to the floor.

In Fig. 4 there is shown a modified form of the invention wherein the portion having five sides as indicated at 17 has an opening 18 for receiving the upper end of the thermos bottle. This portion is tight fitted upon the bottle, and as the bottle is tipped over the sides will prevent the bottle from rolling. A handle 19 extends upwardly from the portion 17, and serves as a carrying handle.

The bumper guard and carrier handle can be molded or pressed out of rubber or rubber-like plastic, preferably all in one piece. The guard can be made of various colors and of different sizes, depending upon the color of the bottle with which it is to be used and the size thereof.

While various changes may be made in the detail construction, it shall be understood that such changes shall be within the spirit and scope of the present invention as defined by the appended claim.

What is claimed is:

A guard for thermos bottles comprising an annular portion of resilient material tight fitted on the upper end of the thermos bottle, at least five circumferentially spaced, radially outwardly extending fingers integrally formed on said annular portion adapted to engage a table surface and prevent the thermos bottle from rolling and to serve as shock absorbers upon tipping the same, and a U-shaped handle portion integrally formed with the upper side of the annular portion and providing a carrying handle or loop by which the thermos bottle may be carried.

References Cited in the file of this patent

UNITED STATES PATENTS

| | | |
|---|---|---|
| 845,777 | Grossman | Mar. 5, 1907 |
| 2,050,841 | Houghton | Aug. 11, 1936 |
| 2,234,458 | Underhill | Mar. 11, 1941 |
| 2,632,666 | Cunningham | Mar. 24, 1953 |
| 2,685,992 | Cornell | Aug. 10, 1954 |